United States Patent [19]
Wilde et al.

[11] Patent Number: 5,844,576
[45] Date of Patent: Dec. 1, 1998

[54] TILED LINEAR HOST TEXTURE STORAGE

[75] Inventors: Daniel P. Wilde, Cedar Park; Timothy J. McDonald, Austin, both of Tex.

[73] Assignee: Cirrus Logic, Inc., Fremont, Calif.

[21] Appl. No.: 773,921

[22] Filed: Dec. 30, 1996

[51] Int. Cl.[6] .................................................. G06F 13/00
[52] U.S. Cl. .......................... 345/525; 345/501; 345/517; 345/523; 345/430; 345/507
[58] Field of Search ..................... 345/418, 430, 345/501, 523–525, 507–509, 515–517

[56] References Cited

U.S. PATENT DOCUMENTS

| | | | |
|---|---|---|---|
| 4,583,185 | 4/1986 | Heartz et al. | 364/521 |
| 4,586,038 | 4/1986 | Sims | 340/729 |
| 4,692,880 | 9/1987 | Merz et al. | 345/430 |
| 4,714,428 | 12/1987 | Bunker et al. | 434/43 |
| 4,715,005 | 12/1987 | Heartz | 364/521 |
| 4,727,365 | 2/1988 | Bunker et al. | 345/139 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,940 | 5/1995 | Sedlar et al. | 382/276 |
| 5,420,970 | 5/1995 | Steiner et al. | 395/133 |

*Primary Examiner*—Kee M. Tung
*Attorney, Agent, or Firm*—Robert V. Wilder; Steven A. Shaw

[57] ABSTRACT

A process and implementing computer system for graphics applications in which polygon information, including transparency, color and other polygon characteristics, is organized, stored and transferred in terms of areas or tiled blocks of information in a matrix configuration. The polygon bytes of texel information are organized in an exemplary 8×8 matrix row and column format in the graphics subsystem for improved cache-hit efficiency and translated to and from the linear addressing scheme of a host storage device when the host storage is accessed to refill the graphics cache. The bytes comprising the memory tiles of polygon information are arranged such that a complete tile of information is transferred in one burst-mode host memory access to minimize normal multi-line access arbitration and other typical access delays.

20 Claims, 6 Drawing Sheets

TILED LINEAR HOST TEXTURE STORAGE

FIELD OF THE INVENTION

The present invention relates generally to computer graphics and more particularly to signal processing methods for multi-dimensional graphics systems with optimized memory mapping for burst mode data transfers.

BACKGROUND OF THE INVENTION

The use and application of computer graphics to all kinds of systems environments continues to increase to an even greater extent with the availability of faster and faster information processing and retrieval devices. The speed of operation of such devices remains a high priority design objective. This is especially true in a graphics system and even to a greater extent with 3D graphics systems. Such graphics systems require a great deal of processing for huge amounts of data and the speed of data flow is critical in providing a new product or system or in designing graphics systems to apply to new uses.

In all data and information processing systems, and especially in computer graphics systems, much time is consumed in accessing data from a memory or storage location, then processing that information and sending the processed information to another location for subsequent access, processing and/or display. As the speed of new processors continues to increase, access time for accessing and retrieving data from memory is becoming more and more of a bottleneck in terms of system speed and overall performance.

Graphic systems must be capable of performing more sophisticated functions in less time in order to process greater amounts of graphical data required by modern software applications. There is a continuing need for improvements in software methods and hardware implementations to draw three-dimensional objects using texture maps which contain full color, shading, and transparency blending information. The development of raster display systems has dramatically reduced the overall cost and increased the capabilities of graphic systems. In a raster display system, a set of horizontal or orthogonal scan lines, each comprising a row of pixels, forms an array or grid of pixels to represent the entire screen area. The screen is preferably a cathode ray tube (CRT) or liquid crystal display (LCD) or the like capable of scanning the entire pixel grid at a relatively high rate to reduce flicker as much as possible.

The pixel data is preferably stored in a frame buffer comprising dynamic random access memories (DRAMs), where each pixel is represented by one or more bits depending upon the desired resolution, color, brightness and other variables. Typical display systems can draw screens with multiple colors with a variety of screen resolutions, such as, but not limited to, 640×480, 800×600, 1024×768, 1280× 1024, or other combinations depending upon the software drivers and the hardware used. A video controller scans and converts the pixel data in the frame buffer to control signals required by the screen system to display the information on the screen. The video controller scans each of the pixels sequentially, from top to bottom and from left to right on the display screen. In a color graphics system using a CRT, three separate beams are controlled i.e. one beam each for each of the primary colors, where the intensity of each of the beams is determined by the pixel value corresponding to the respective colors. A similar system is used for LCD devices. Each pixel value may comprise, for example, 24 bits, i.e. one 8-bit byte for each of the primary colors red, green and blue, where the byte value determines the intensity of the respective color to be displayed.

Texture maps in memory may be stored in a local, relatively fast, RDRAM memory in a graphics device, or such maps may be stored in the system or host memory. When stored as part of a larger host memory, delays in accessing data from the host texture maps are encountered because of the speed of the memory type itself and also because of the nature of the configuration and access process of the host memory.

With specific reference to computer graphics applications, image texture information, such as color transparency of displayed images, is stored in texture maps. A texture map is a two dimensional array of "texels" consisting of "U" texels in the horizontal direction, and "V" lines of texels in the vertical direction. As a polygon is rendered, texels are fetched from a "texture map", processed for lighting and blending, and then such texels become "pixels" of the polygon. As an image is produced on a display screen, each line of data stored in a frame buffer is sequentially accessed and transferred to the display device to fill-in corresponding sequential lines of pixels on the display. The frame buffer is updated by a draw engine portion of the graphics system, which is, in turn, updated by a texture engine portion of the graphics system. The texture engine accesses a texture map which is usually stored in system or host memory. Each such access and transfer of texture information from host memory has a delay time associated therewith because of the inherent dependence of the storing and accessing process. For each access to a texture map stored in host memory, for example, there is a processing latency, as well as delays due to bus access and host memory access arbitration. Moreover, in graphics systems, the next texel of information needed is frequently not the next linear line of information from memory but rather the next texel in a different direction from the last texel transferred. Because of the nature of the linear storage of information in host memory, whenever a texel of information is required by the graphics engine which is not the next linearly displaced texel of information as stored in the host memory, then a new access to the host memory is required to locate the requested texel.

Although many memory systems have a relatively large access time, systems including a PCI bus architecture are able to compensate to some extent by being able to burst sequential accesses after the first access is made. However with conventional texture map storage and information transfers, systems have heretofore been unable to take advantage of the burst access feature for host memories. Accordingly, there is a need for a new method of texture map storage and texel data transfer which is effective in decreasing the number of accesses typically required in graphics and other applications, as well as increasing overall system speed. There is also a need for an improved method and apparatus effective to optimize the number of data increments processed and also to maximize the informational transfer efficiency i.e. to maximize the percentage of the useful data provided per host memory access.

SUMMARY OF THE INVENTION

A method and system is provided for optimally dividing a texture map into memory tile segments wherein each of the segments is related to a block or tile of information containing data capable of describing a block or tile section covering a predetermined horizontal portion of a plurality of vertically displaced lines of a texture image. The block or tile section is cached in the graphics unit, and the tile configuration results in a higher hit rate to the local cache vis-a-vis a linear or line-by-line configuration, for requested data being fetched from a texture map. When a requested address is not contained in the local graphics cache, the host memory is accessed and the requested tile segment of information is transferred in burst mode from the host memory, and reassembled in tile format for cache storage and use by the graphics unit.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
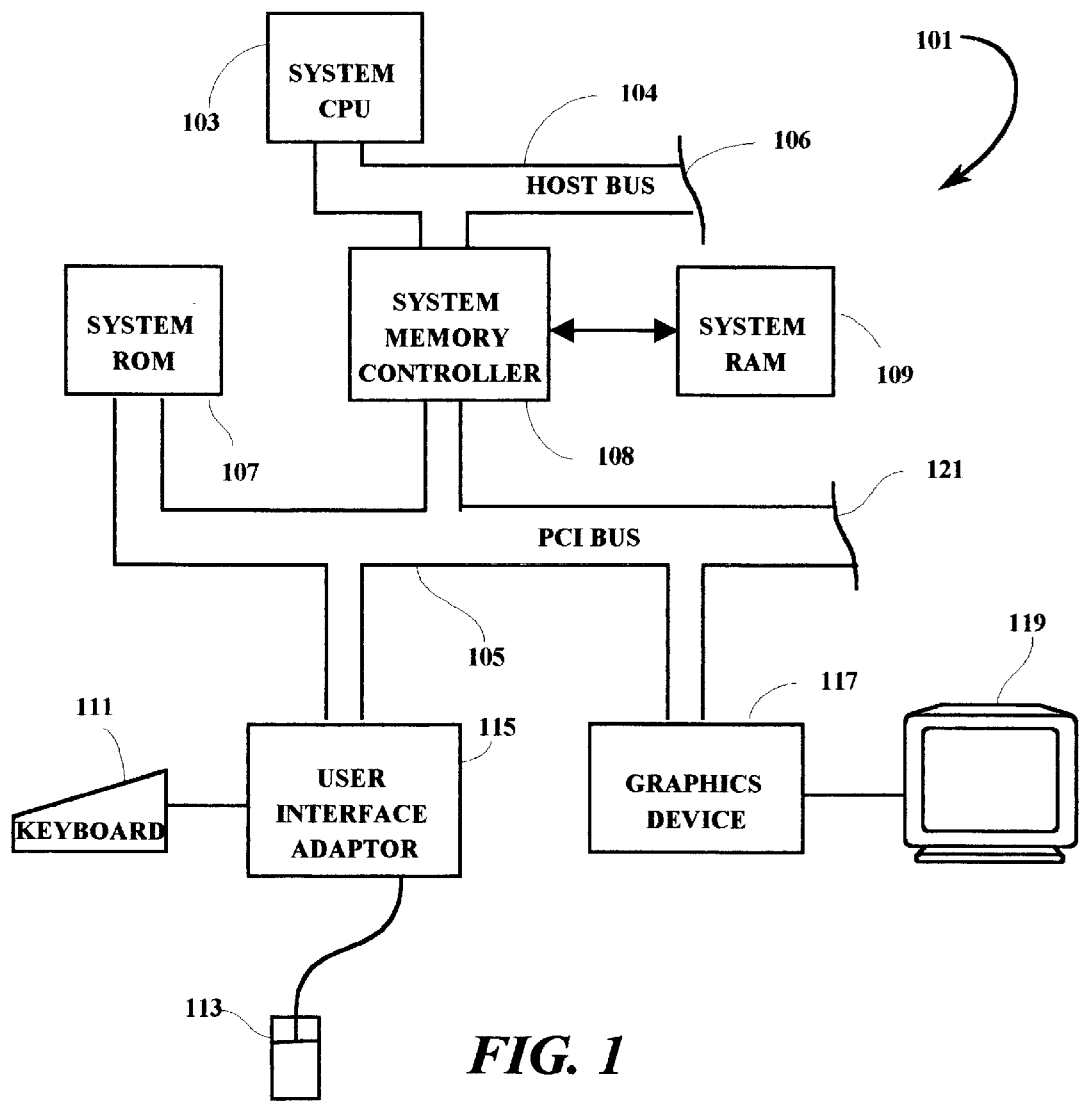
FIG. 1 is a block diagram of a computer system including a graphics system.

With reference to FIG. 1, the various methods discussed above may be implemented within a typical computer system or workstation 101. A typical hardware configuration of a workstation which may be used in conjunction with the present invention is illustrated and includes a system central processing unit (CPU) 103, such as a conventional microprocessor, and a number of other units interconnected through a system or host bus 104. A system memory controller 108 is connected between the host bus 104 and a PCI bus 105. The system memory controller 108 is connected to a system RAM 109. The PCI bus 105 is connected to system ROM 107 and also to a user interface adaptor 115. The user interface adaptor 115 is arranged for connection to various user input devices such as a keyboard 111 and a mouse device 113. Other user interface devices such as a touch screen device (not shown) may also be coupled to the PCI bus 105 through the user interface adapter 115. A graphics device 117 is connected to the PCI bus 105 and also to a display device 119. The PCI bus 105 may include an extension 121 for further connections to other workstations or networks, and the like. Since the workstation or computer system 101 within which the present invention is implemented is, for the most part, generally known in the art and composed of electronic components and circuits which are also generally known to those skilled in the art, circuit details beyond those shown in FIG. 1, will not be explained to any greater extent than that considered necessary as illustrated above, for the understanding and appreciation of the underlying concepts of the present invention and in order not to obfuscate or distract from the teachings of the present invention.

Figure 2:
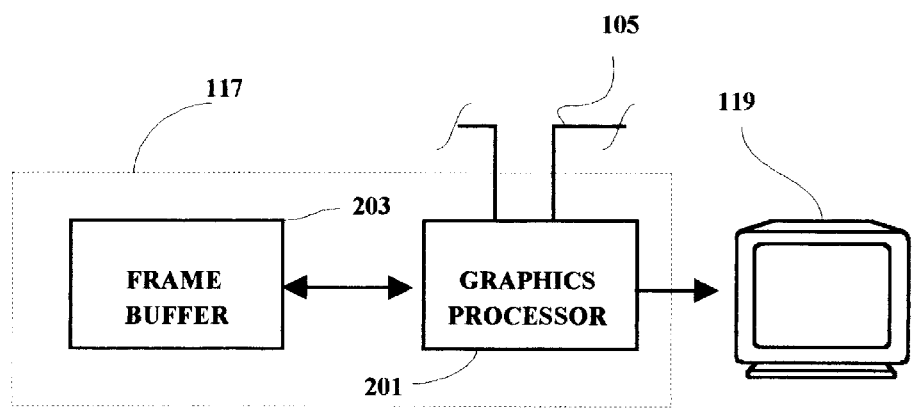
FIG. 2 is block diagram of the graphics device shown in FIG. 1.

In FIG. 2, the PCI bus 105 is shown connected to the graphics device or subsystem 117. The graphics device 117 may include, for example, a graphics processor 201 which is arranged to process, transmit and receive information or data from a frame buffer unit 203 as well as to and from the system or host memory 109. The frame buffer unit 203 contains frame display information which is accessed by the graphics processor 201 which, in turn, is connected to a display device 119. The display device 119 is operable to provide a graphics display of the information stored in the frame buffer 203 as processed by the operation of the graphics processor 201. Although the present example shows a graphics processor 201 separate from a system CPU 103, it is understood that the present invention is not limited to having a separate graphics processor but rather also includes systems in which the methodology taught herein is implemented within or as part of a single system CPU or other larger system chip or integrated circuit.

Figure 3:
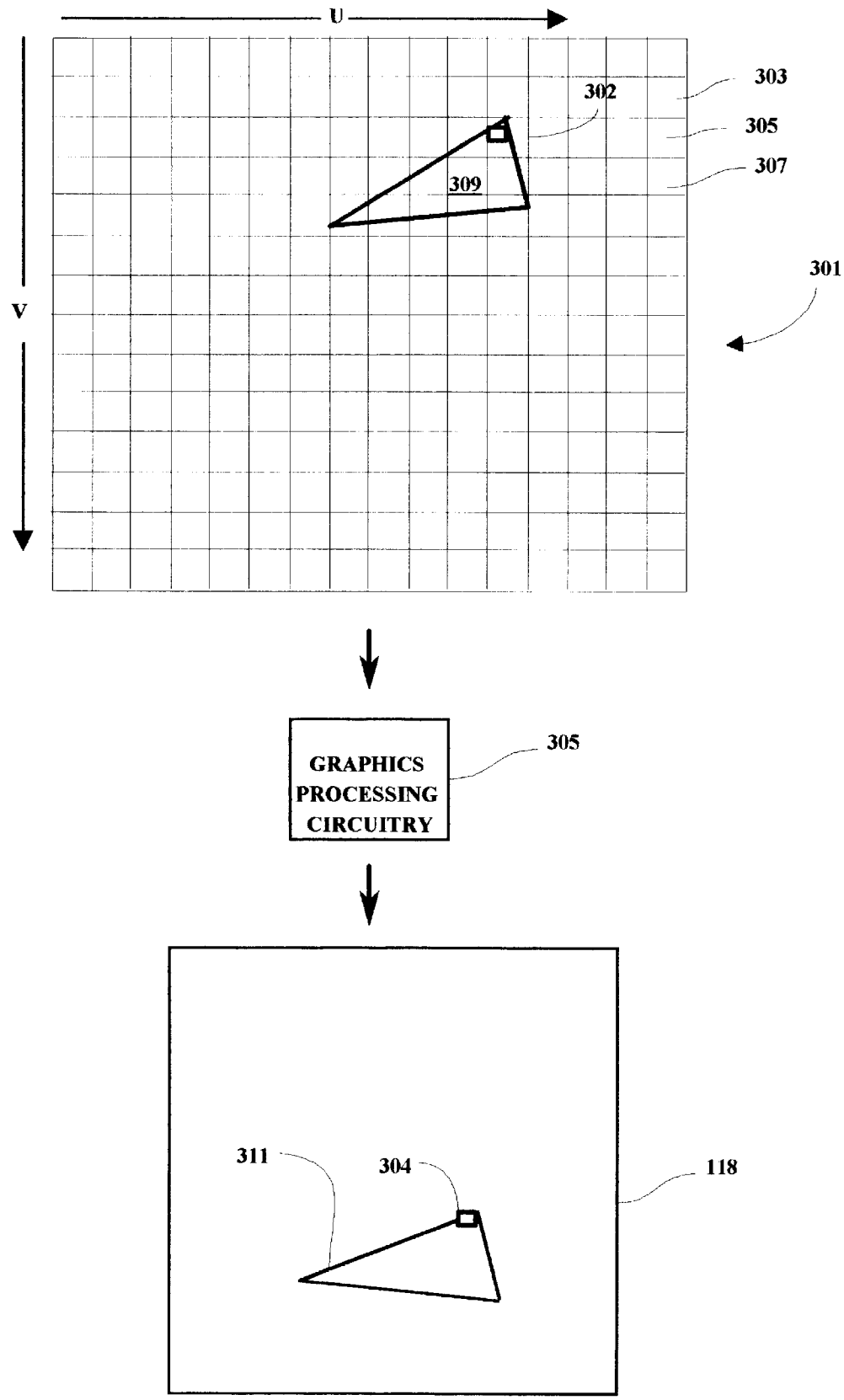
FIG. 3 is an illustration showing an exemplary texture map for generating a corresponding graphics polygon.

In FIG. 3, there is shown a texture map (TM) 301 which includes a matrix of tiles including tiles 303, 305 and 307. The texture map 301 defines an area of memory which contains digital texture information to be applied to a particular polygon such as polygon 311. As hereinbefore noted, texture information includes information describing the various attributes of a polygon such as transparency and color. In graphics systems, there is also a separate polygon rendering engine for generating the shapes of various polygons. The texture memory space is referred to as "UV space" since the space is defined in terms of "U" and "V" coordinates. In a texture map, "texels" such as texel 302, define the smallest addressable point in a texture map. For example, in FIG. 3, texel 302 in texture map 301 will be fetched and rendered as pixel 304 on a display screen 118. Texture information in texture or "UV" space concerning a polygon 309 is processed with polygon information in "X-Y" space by graphics circuitry 305 to effect the display of a 3-D color polygon 311 on the display screen 118. The number of bits per texel or pixel varies and depends upon the particular application the screen resolution, and the texture resolution.

Figure 4:
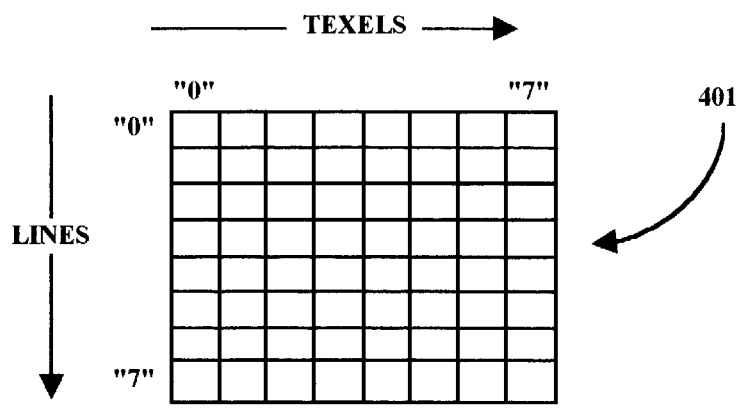
FIG. 4 is an illustration showing an exemplary tile memory segment configuration.

In FIG. 4, an exemplary individual tile segment 401 of a texture map is illustrated. As shown, the tile 401 is comprised of eight lines and each line includes eight texels of information in the present example. The particular configuration of the tiles of memory as implemented in accordance with the present invention is not necessarily limited to an 8×8 matrix as shown. The advantages of the present invention may also be attained with tiles having as few as two lines, in which case there would be 32 bytes per line for a total area of 64 bytes in the present example. The total memory area need not equal 64 bytes per tile although that convention has been chosen for the present example. It has been found that there is a maximum increase in system speed when the tiles are configured in an 8×8 matrix as shown since, in the present example, the graphics cache has a corresponding matrix and the likelihood of a local graphics cache "hit" in drawing texels from a fast local memory (i.e. graphics system memory rather than host system memory) increases when the tile configuration is shaped more like a "square" rather than an "oblong". This is so since in texture mapping, the next texel fetched is likely to be in any direction from the texel just fetched and hence if a cache is configured with "backup" bytes in all directions, such as a square configuration, it is more likely that the next fetch will be stored in the graphics cache and there will be no need to access the system bus to access and retrieve information from the relatively slower system or host memory.

Figure 5:
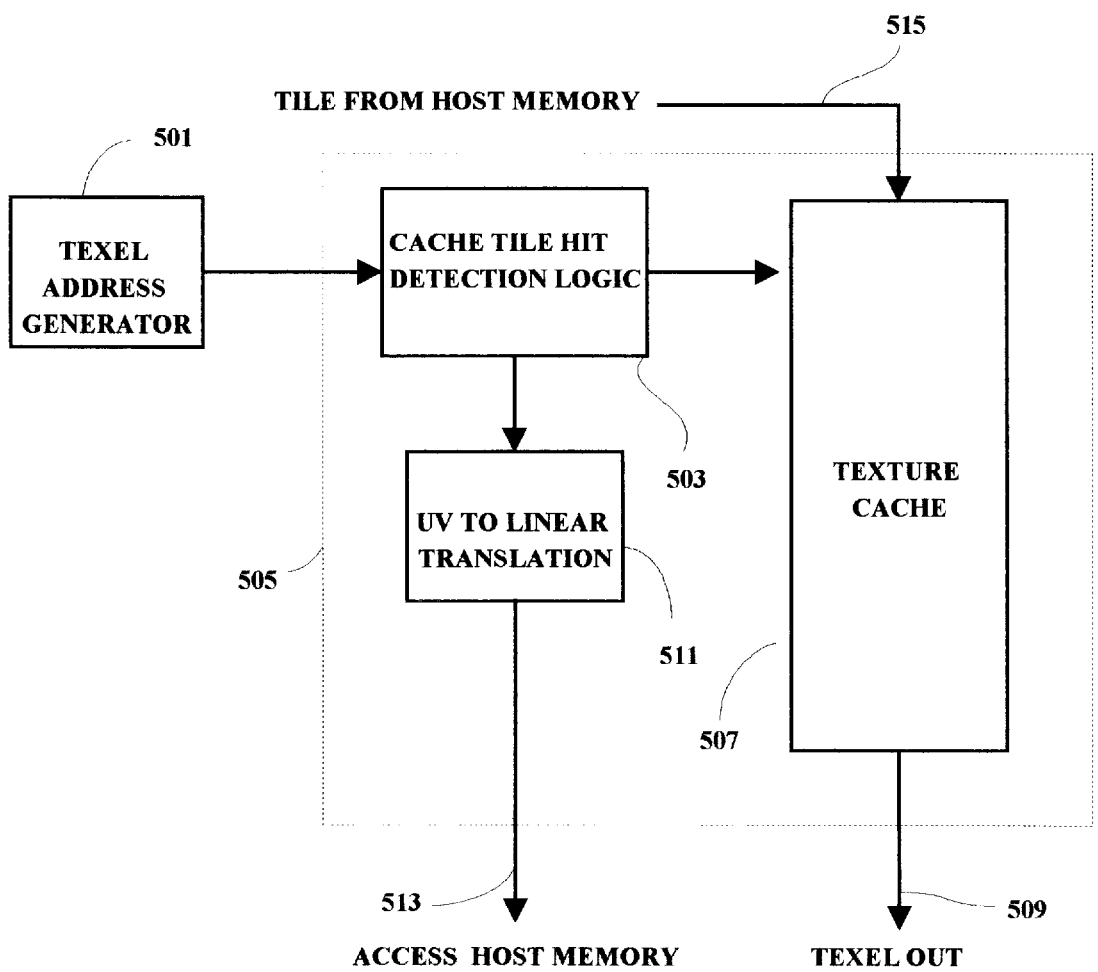
FIG. 5 is a block diagram showing a portion of the graphics processing circuitry.

FIG. 5 shows a block diagram of the basic functional units in an exemplary implementation of the disclosed methodology. In a graphics application, as points are drawn on a screen and polygons are assembled for display, a texture engine generates requests for designated addresses. For example, a Texel Address Generator 501 will generate a texel address request which is sent to a Cache Tile Hit Detection Logic Circuit 503 which is included within a Texture Cache Controller 505. The Detection Logic determines whether or not the requested texel is already stored in the local graphics Texture Cache 507. The Texture Cache 507 in the present example is a 1K byte cache comprised of sixteen "ways" with each way including 64 bytes. Thus, since each tile of memory includes 64 bytes, the Cache 507 can hold 16 tiles of memory. If the requested texel address is in the Texture Cache 507, then a Texel Out 509 is provided to the requesting graphics circuitry for further processing.

So long as the requested texel address is determined to be in the local graphics cache, that process will continue, and the information processing continues at an optimum speed. However, when the Cache Tile Hit Detection Logic 503 determines that the requested texel address is not present in the Texture Cache 507 located within the graphics device 201, then a request must be made to access the system or host memory 109 to retrieve and transfer another block of information containing the requested address. Block 511 translates the UV linear address to the linear "start" address of the tile in host memory. The requested texel, as part of a sixty-four byte block surrounding the requested texel, is burst transferred from host memory 109 to the graphics texture cache 507. As hereinbefore noted, that method of cache storage provides a significantly higher probability of a cache "hit" for the next requested texel than would be the case if the 64 byte transfer from host memory contained only bytes corresponding to a portion of a single line of the texture map. With the "squared-off" format or block burst transfer, the requested address and the surrounding block of texels will be transferred from the Texture Map in host memory 109 to the Texture Cache 507. The requested information is provided 515 from the host memory 109 to the Texture Cache 507 and the Texture Cache can provide the requested Texel Out information 509 for further processing by the graphics circuitry 201. Although the texture cache 507 is configured as 16 ways of 64 bytes per way, the method of storage and access is such that instead of storing bytes corresponding to a sequential series of texels from the texture map, each cache way, in the present example, contains a tile or block of bytes having a "depth" of at least two lines (eight lines in FIG. 4) in order to cache the bytes surrounding a particular texel being processed in anticipation of providing the next texel which may be requested by the graphics application.

Figure 6:
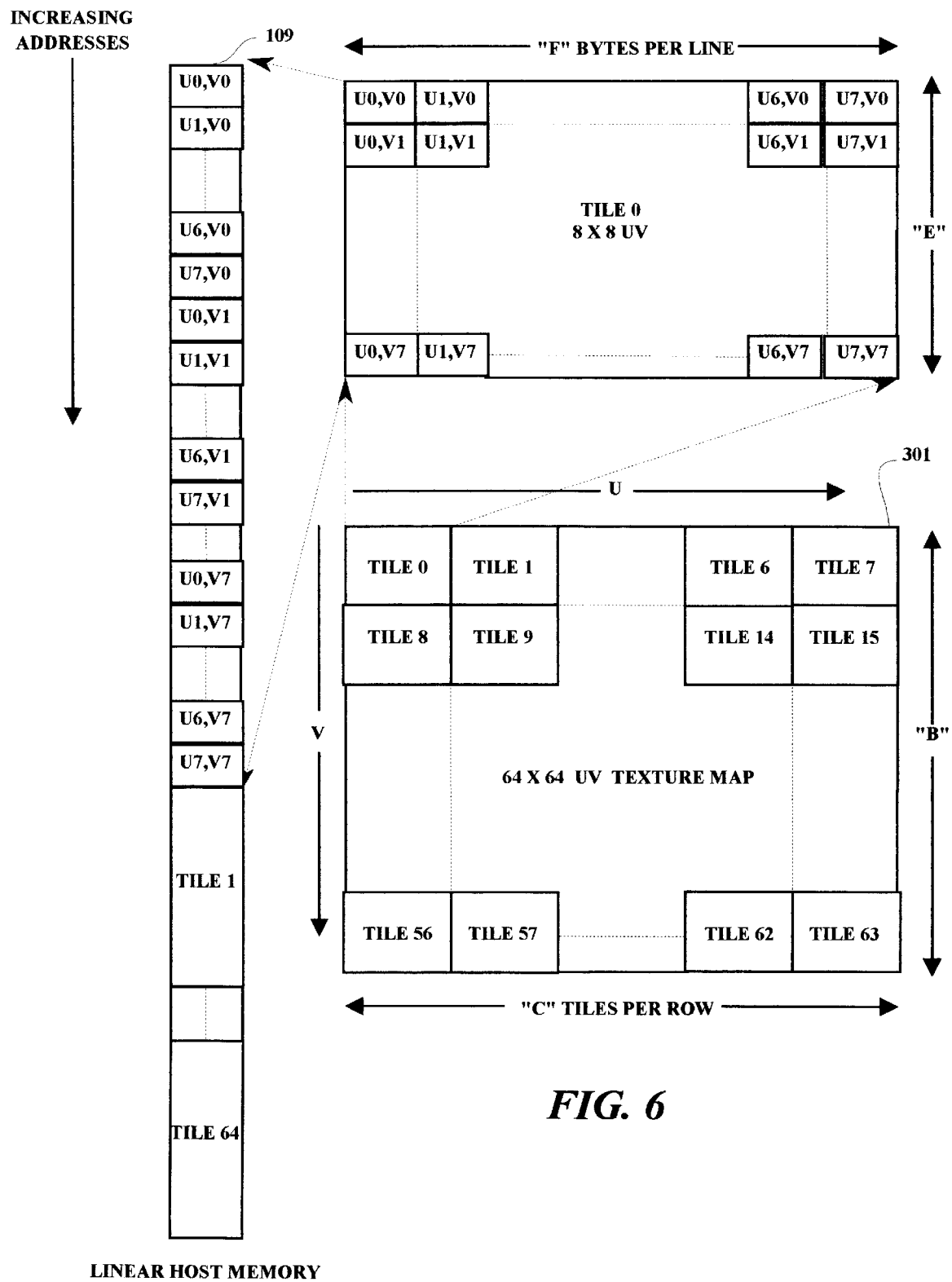
FIG. 6 is an illustration of the tiled technique, format and configuration for texture map storage.

In FIG. 6, the methodology of translating the bytes and tiles of the graphics system to and from the linear addressing system of the host memory is illustrated in more detail. In the graphics system, the Texture Map 301 in the present example is comprised of sixty-four tiles which are designated "TILE 0" through "TILE 63" in FIG. 6. The tiles are laid with "C" tiles of memory across in "U" space and "B" rows of tiles down the "V" axis and define a memory area comprising "A" tiles. The constants "A", "B" and "C" may have different values depending upon the particular application. In the disclosed embodiment, the number of tiles per row "C" is eight, the number of rows of tiles "B" is also eight, and the memory area "A" is therefore sixty-four tiles.

Similarly, "Tile 0" is expanded into "E" lines of "F" bytes per line to comprise a total byte space of "D" bytes. In the present example, tiles are configured in an 8×8 matrix so that the dimensions "E" and "F" are both "8" and the total byte space per tile "D" is "64". As hereinbefore noted, the squared 8×8 tile configuration is preferred, although not required, since it maximizes the probability of a TM cache hit in the graphics system operation. As shown, the host memory 109 addresses linearly such that individual bytes such as {U0V0}, {U1V0}, {U2V0} etc., are stored and retrieved from increasing addresses in sequential linear positions of host memory.

Figure 7:
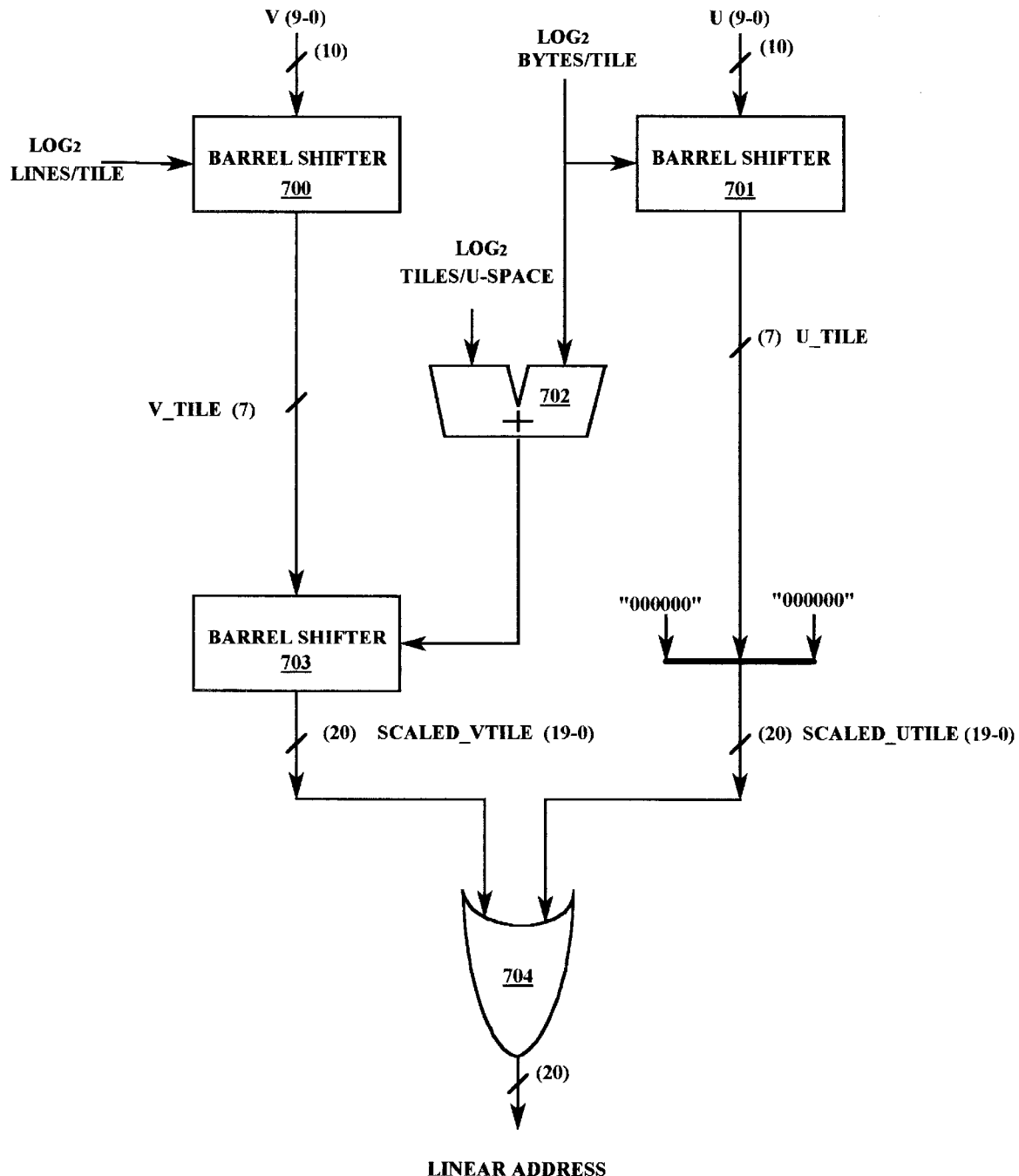
FIG. 7 is a simplified schematic drawing of the "UV" to linear translation circuit shown in FIG. 5.

In FIG. 7, the UV to linear translation block 511 is shown in more detail. In the present example, a first barrel shifter 700 receives inputs including a ten bit "V" address and a signal representative of $Log_2$ of the number of lines per Tile. A second barrel shifter 701 receives inputs including a ten bit "U" address and a signal representative of the $Log_2$ of the number of Bytes-per-Tile. An ADDER 702 also receives an input representative of the $Log_2$ of the number of Bytes-per-Tile as well as a second input representative of the $Log_2$ of the number of Tiles-per-U-space and provides an output which is in turn applied to a third barrel shifter 703. The third barrel shifter 703 in turn receives another input "V_TILE" from the output of the first barrel shifter 700, and provides an output "SCALED_VTILE" to one input of an OR gate 704. The second barrel shifter 701 provides an output "U_TILE" which is scaled by combination with a twelve bit expansion to furnish a "SCALED_UTILE" signal which, in turn, is applied to a second input of the OR gate 704. The OR gate 704 provides an output signal representative of a linear "start" address of the tile containing the texel requested by the graphics subsystem.

The UV to linear circuit 511 is used to translate a UV texel address into the linear tile start address containing that texel, and allowing the host memory controller to fetch the desired tile into the graphics device cache memory. This is accomplished by first calculating the tile that the UV texel belongs to, i.e., in the present example, by shifting off the lower order address bits corresponding to the size of a tile. In the illustrated example, which uses an 8×8 tile configuration, barrel shifters 700 and 701 are implemented to shift off the three least significant U and V address bits to get the UV tile address to which the requested texel belongs. The U tile address is then scaled to generate the U tile contribution to the linear offset. The scale factor is the number of Bytes-per-Tile implemented in the application. In the present 64 Byte-per-tile example, the scale factor is "64". The circuit accomplishes the scaling by shifting the address six times to the left. No actual hardware is necessary if "6" is added to the significance of each U tile address bit.

In parallel to the U tile address processing described above, the V tile address is also scaled to generate the V tile contribution to the linear offset. The V tile scaling factor is determined to be the total number of tiles in U space times the Bytes-per-tile. In the present example, the total tiles in "U space" is "8", and the "Bytes-per-tile" is "64", which results in a scale factor of "512"(8*64). In the implementing circuitry, that scaling is accomplished by first adding, by ADDER 702, the $Log_2$ of the "Total Tiles in U Space", and the $Log_2$ of the "Bytes-per-Tile". That addition results in a shift factor which is applied to barrel shifter 703 to shift the "V" Tile address to the left by the shift factor. That results in increasing the significance of the "V" Tile address bits by the shift factor. The linear offsets for both the "U" Tile contribution and the "V" Tile contribution are logically "ORed" together by "OR" circuit 704 to form the final linear address. The Linear Address therefore equals "V_tile_shifted" or "U_tile_shifted".

In order to minimize retrieval time to retrieve information from the host memory 109, utilization is made of the system PCI "burst" mode in which only one address is designated in an address request and the system memory controller chip 108 automatically transfers a group of byte addresses following the designated address without the need of a separate access request and the latent and other delay times associated with separate requests. In order to enable the use of the burst mode, translator circuit 511 has been implemented between the graphics system and the host memory to insure the integrity of the tile memory configuration in the graphics system without modification to the linear addressing system of the host memory. The translation methodology insures that each burst of 64 sequential bytes of information is properly laid into the memory tile configuration format of 8 rows of 8 bytes each for use within the graphics system. Also, address requests generated in the tile configuration format must be translated to designate the correct corresponding address in host memory. AS shown in FIG. 6, eight bytes from the first line (XXV0) are stored sequentially in host memory but the ninth byte U0V1 must be taken from the second line of TILE 0, as so forth. Similarly, the ninth tile (TILE 8) from the Texture Map is taken from the second row of tiles, and so on for every succeeding row. Accordingly, the disclosed method and apparatus allows the graphics system to take advantage of system speed increases from two different sources at the same time. The graphics system operates at a faster overall speed because (1) the tile caching methodology results in a higher graphics cache "hit" rate and therefore fewer access requests from the relatively slower host memory, and (2) the translation method from tile format to linear format allows use of the very fast burst mode in transferring information from the host memory in situations where a host memory access is required.

Figure 8:
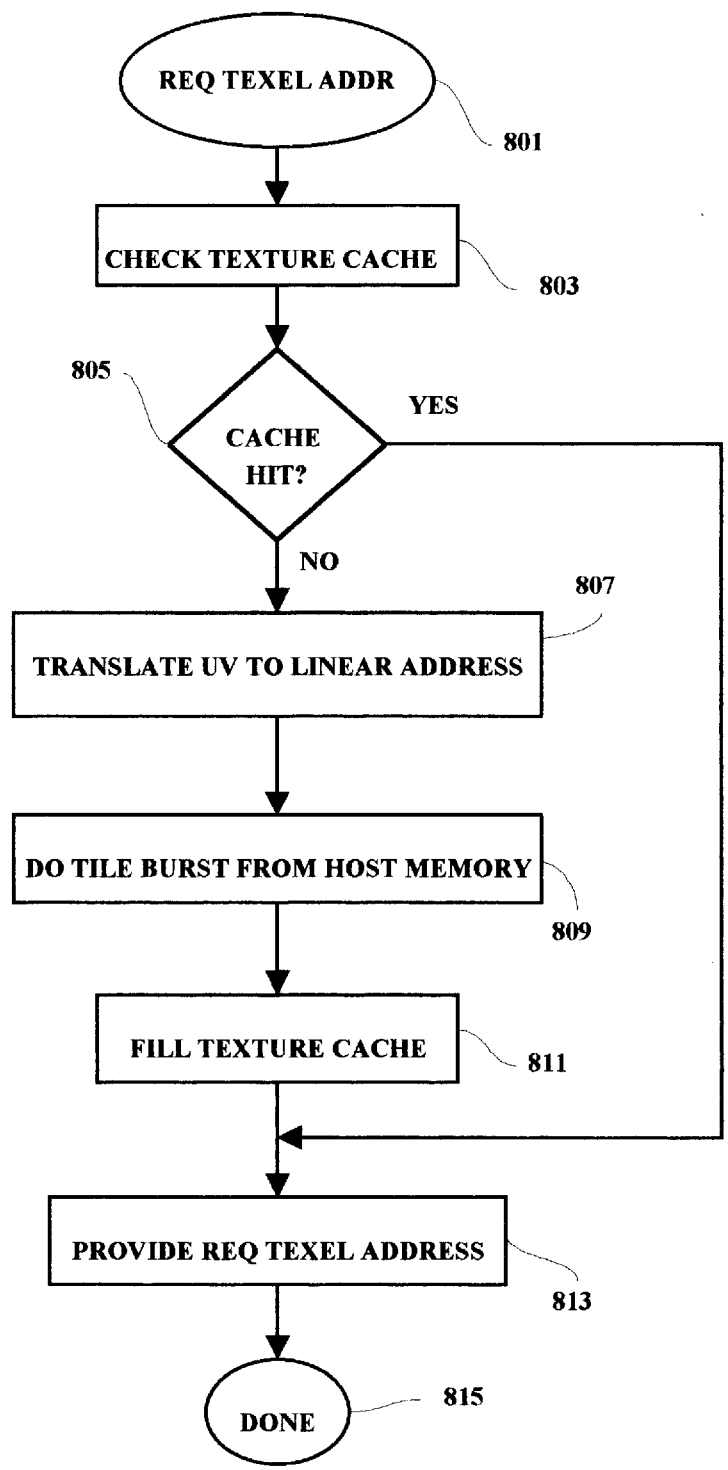
FIG. 8 is a flow chart showing the tiling method for graphics processing and texel retrieval.

A flow chart of the methodology disclosed herein is shown in FIG. 8. A Texel Address Request 801 is made by the address generator 501, which causes the system to detect 503 if the requested address is contained in the graphics or texture cache 803. If the requested address is not present 805 in the graphics cache 803, then the UV address is translated 807 into a linear equivalent by the translation circuit 511. At that point in the process, the request for a burst transfer is made 809 to the host memory 109 where the entire Texture Map is stored. Next, the texture cache 507 in the graphics device 201 is filled 811 and the requested texel address is provided 813 for further processing. If the requested texel address is detected to be in the texture cache at the detection step 805, then the process is effective to immediately provide the requested texel address 813 and the process is done 815 until there is another texel address request 801.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for organizing blocks of display-related information, said display-related information being representative of at least one characteristic of a plurality of image pixels defining an image to be presented on a screen of a display device, said display device being operated in conjunction with an information processing system, said method including the steps of:

dividing said image pixels into image pixel blocks, each of said image pixel blocks being comprised of a first predetermined number of lines of image pixel bytes of said display-related information, and a second predetermined number of columns of image pixel bytes of said display-related information, said first predetermined number being greater than one, each of said image pixel blocks containing data capable of describing a block section covering a predetermined horizontal portion of at least two vertically displaced lines of a texture image; and designating said image pixel blocks into rows of image pixel blocks, said rows being displaced vertically to cover said screen of said display device.

2. The method as set forth in claim 1 and further including:

determining said first predetermined number in accordance with an information transfer bandwidth of said information processing system.

3. The method as set forth in claim 1 and further including:

determining said second predetermined number in accordance with an information transfer bandwidth of said information processing system.

4. The method as set forth in claim 1 and further including:

caching said image pixel blocks in a cache unit for requested data points contained within said image pixel blocks.

5. The method as set forth in claim 4 wherein said first and second predetermined numbers are determined such that a single information transfer within said information processing system includes at least one evenly divisible portion of said image pixel blocks of said image pixel bytes.

6. The method as set forth in claim 5 wherein said first and second predetermined numbers are determined such that each information transfer includes at least one entire image pixel block.

7. The method as set forth in claim 6 wherein said first predetermined number of lines of said display-related information is equal to said second predetermined number of columns of said display-related information.

8. The method as set forth in claim 1 wherein said first predetermined number of lines of said display-related information is equal to said second predetermined number of columns of said display-related information.

9. The method as set forth in claim 8 wherein said first and second predetermined numbers are equal to a multiple of the integer 8.

10. The method as set forth in claim 1 wherein said first predetermined number of lines of said display-related information is related to said second predetermined number of columns of said display-related information such that a product of said first predetermined number and said second predetermined number equals a constant predetermined product number, said constant predetermined product number being equal to said number of image pixel bytes in one of said image pixel blocks.

11. A graphics station, including an information processing system comprising a main bus and a display device, and a graphics subsystem, said graphics subsystem comprising a graphics processor device connected to said main bus and to said display device, said graphics subsystem further including a graphics memory coupled to said graphics processor, said graphics subsystem being selectively operable for storing and processing information representative of an object to be drawn on the display device, said graphics subsystem being selectively operable for organizing blocks of display-related information, said display-related information being representative of at least one characteristic of a plurality of image pixels defining an image to be presented on a screen of said display device, said graphics subsystem being selectively operable to accomplish the steps of:

dividing said image pixels into image pixel blocks, each of said image pixel blocks being comprised of a first predetermined number of lines of image pixel bytes of said display-related information, and a second predetermined number of columns of image pixel bytes of said display-related information, said first predetermined number being greater than one, each of said image pixel blocks containing data capable of describing a block section covering a predetermined horizontal portion of at least two vertically displaced lines of a texture image; and designating said image pixel blocks into rows of image pixel blocks, said rows being displaced vertically to cover said screen of said display device.

12. The graphics station as set forth in claim 11 and further including:

determining said first predetermined number in accordance with an information transfer bandwidth of said information processing system.

13. The graphics station as set forth in claim 11 and further including:

determining said second predetermined number in accordance with an information transfer bandwidth of said information processing system.

14. The graphics station as set forth in claim 11 and further including:

caching said image pixel blocks in a cache unit for requested data points contained within said image pixel blocks.

15. The graphics station as set forth in claim 14 wherein said first and second predetermined numbers are determined such that a single information transfer within said information processing system includes at least one evenly divisible portion of said image pixel blocks of said image pixel bytes.

16. The graphics station as set forth in claim 15 wherein said first and second predetermined numbers are determined such that each information transfer includes at least one entire image pixel block.

17. The graphics station as set forth in claim 16 wherein said first predetermined number of lines of said display-related information is equal to said second predetermined number of columns of said display-related information.

18. The graphics station as set forth in claim 11 wherein said first predetermined number of lines of said display-related information is equal to said second predetermined number of columns of said display-related information.

19. The graphics station as set forth in claim 18 wherein said first and second predetermined numbers are equal to a multiple of the integer "8".

20. The graphics station as set forth in claim 11 wherein said first predetermined number of lines of said display-related information is related to said second predetermined number of columns of said display-related information such that a product of said first predetermined number and said second predetermined number equals a constant predetermined product number, said constant predetermined product number being equal to said number of image pixel bytes in one of said image pixel blocks.

* * * * *